United States Patent
Ghodbane et al.

(10) Patent No.: US 6,758,052 B2
(45) Date of Patent: Jul. 6, 2004

(54) HVAC SYSTEM WITH POST-SHUT DOWN ISOLATION AND VENTING OF EVAPORATOR USING H-SHAPED VALVE

(75) Inventors: Mahmoud Ghodbane, Lockport, NY (US); James A. Baker, Williamsville, NY (US); Prasad S. Kadle, East Amherst, NY (US); Xiaoxia Mu, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/465,092

(22) Filed: Jun. 19, 2003

(65) Prior Publication Data

US 2004/0003612 A1 Jan. 8, 2004

Related U.S. Application Data

(60) Provisional application No. 60/393,271, filed on Jul. 2, 2002.

(51) Int. Cl.[7] .......................... F25B 41/00; F25B 49/00
(52) U.S. Cl. .......................................... 62/197; 62/117
(58) Field of Search ........................ 62/197, 117, 174, 62/199; 137/110, 599.01

(56) References Cited

U.S. PATENT DOCUMENTS

| | | | |
|---|---|---|---|
| 3,196,630 A | * 7/1965 | Barbier | 62/197 |
| 3,807,425 A | 4/1974 | Boirum et al. | 137/110 |
| 4,147,182 A | 4/1979 | Akerblom | 137/625.17 |
| 5,408,841 A | * 4/1995 | Fujiwara et al. | 62/192 |
| 5,946,939 A | 9/1999 | Matsushima et al. | |
| 6,000,421 A | 12/1999 | Huemer et al. | 137/110 |
| 6,330,805 B1 | * 12/2001 | Galian | 62/196.1 |
| 6,505,478 B1 | 1/2003 | Cousineau et al. | |

FOREIGN PATENT DOCUMENTS

| | | |
|---|---|---|
| JP | 55156708 | 12/1980 |
| JP | 2001194032 | 7/2001 |

* cited by examiner

*Primary Examiner*—Marc Norman
(74) *Attorney, Agent, or Firm*—Patrick M. Griffin

(57) ABSTRACT

An air conditioning system for a vehicle including an integral valve block (32) having a liquid line bore (42) extending therethrough and a suction line bore (44) extending therethrough with a transverse by-pass passage (34). The by-pass check valve (38) of the first system of FIGS. 1 and 2 allows only one-way fluid flow through the by-pass passage (34) from the suction fluid line (22) to the liquid fluid line (20), whereas the by-pass check valve (40) of the second system of FIGS. 3 and 4 allows only one-way fluid flow through the by-pass passage (34) from the liquid fluid line (20) to the suction fluid line (22). Also integrated into the valve block (16) is a suction check valve (46) in the suction fluid line (22) for allowing one-way fluid flow from the evaporator (16) to the compressor (12).

16 Claims, 2 Drawing Sheets

HVAC SYSTEM WITH POST-SHUT DOWN ISOLATION AND VENTING OF EVAPORATOR USING H-SHAPED VALVE

RELATED APPLICATION

This application claims the priority of provisional application No. 60/393,271 filed Jul. 2, 2002.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Such systems utilize various valve arrangements for controlling flow through the system during operation and during shutdown and/or in response to a leak of refrigerant in the system. Some systems employ valves for bypassing the flow of refrigerant around the evaporator. However, such systems normally include the attendant plumbing for affecting the by-pass.

SUMMARY OF THE INVENTION AND ADVANTAGES

The subject invention provides a compact by-pass arrangement that includes the valves and may be disposed next to or adjacent to the evaporator. The invention includes a valve body having a by-pass passage extending between the liquid and suction fluid lines, a by-pass valve at the intersection of the liquid fluid line and the by-pass passage. The by-pass valve has a normal operating position for directing fluid flow from the liquid fluid line to the evaporator and a by-pass position for directing fluid flow from the liquid fluid line to the by-pass passage. The valve also includes a by-pass check valve for allowing only one-way fluid flow through the by-pass passage when the by-pass valve is in the by-pass position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
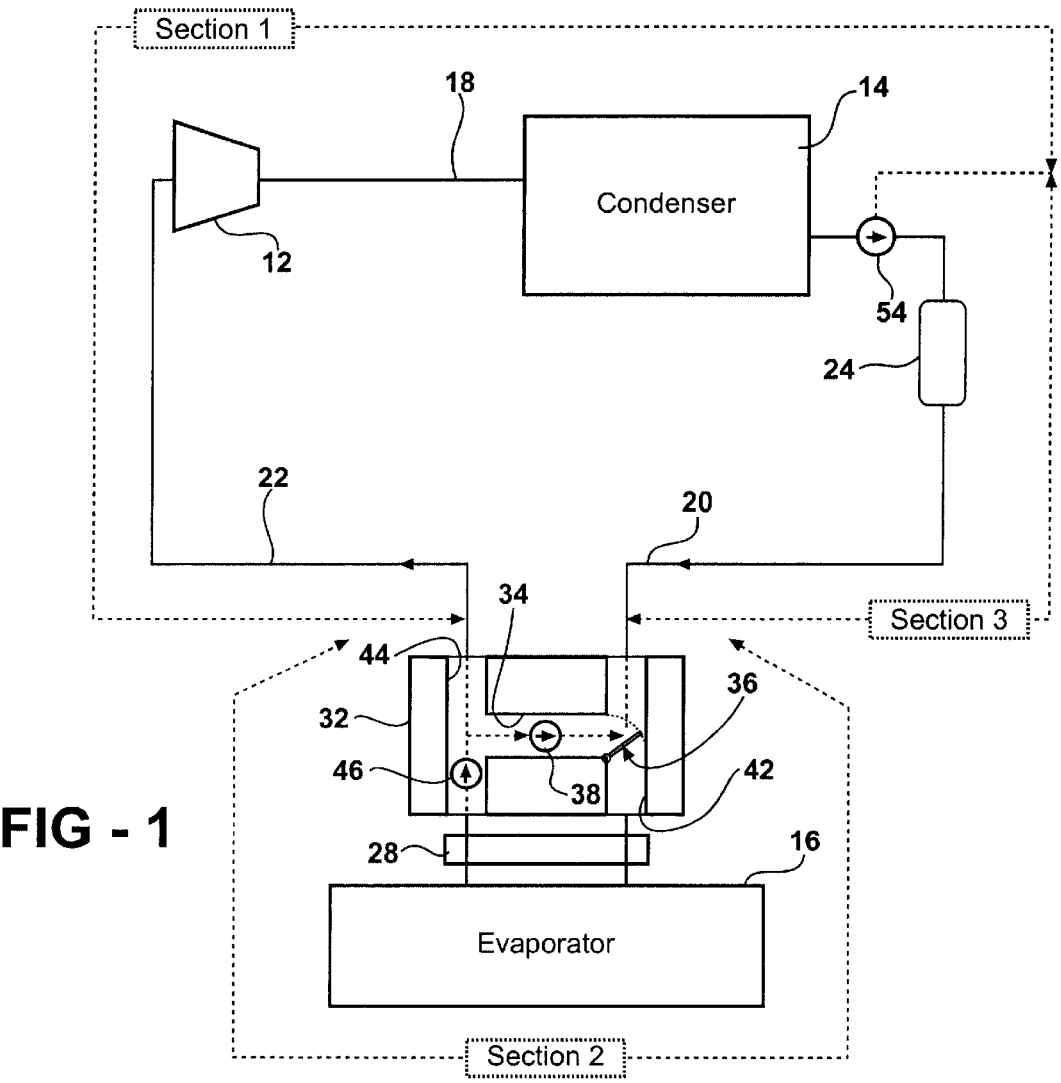
FIG. 1 is schematic view of a first system incorporating the subject invention with the by-pass valve in the by-pass position.

An air conditioning system for a vehicle is shown schematically in FIG. 1 and typically comprises a compressor 12 for compressing a refrigerant, a condenser 14 for condensing the refrigerant, and an evaporator 16 for evaporating the refrigerant.

A discharge fluid line 18 interconnects the compressor 12 and the condenser 14 and a liquid fluid line 20 interconnects the condenser 14 and the evaporator 16, while a suction fluid line 22 interconnects the evaporator 16 and the compressor 12. In some systems a receiver/drier (R/D) 24 (FIG. 1) may be disposed in the liquid fluid line 20 and in others an accumulator/dehydrator (A/D) 26 (FIG. 3) may be disposed in the suction fluid line 22 (as is well known in the art).

Figure 3:
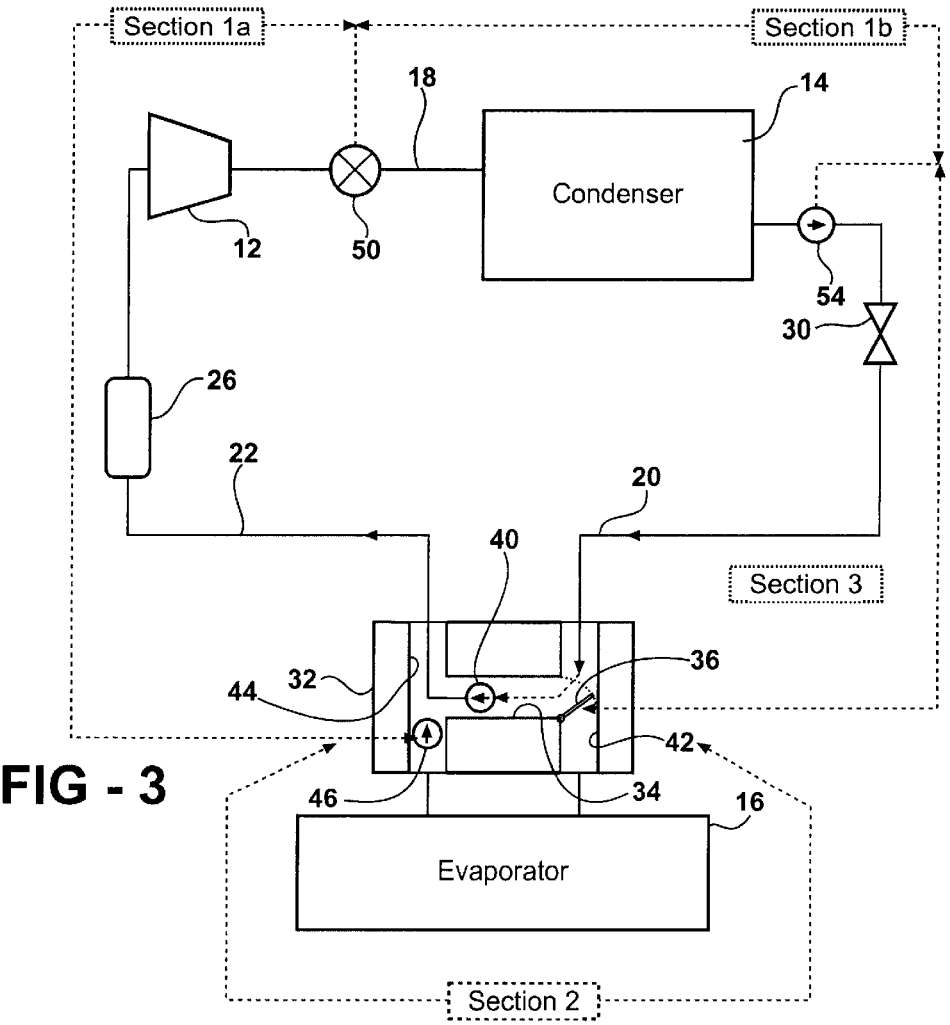
FIG. 3 is a schematic view of a second system incorporating the subject invention with the by-pass valve in the by-pass position.

FIG. 1 represents a system configuration wherein a thermal expansion valve (TXV) 28 is disposed in the fluid lines 20 and 22 into and out of the evaporator 16 and FIG. 3 represents an expansion device 30, such as an orifice tube, being intermediate between the condenser 14 and the evaporator 16 in the liquid fluid line 20.

The system includes an integral valve 32 having a by-pass passage 34 extending between the liquid 20 and suction 22 fluid lines. The integral valve 32 includes a by-pass valve 36 at the intersection of the liquid fluid line 20 and the by-pass passage 34 that has a normal operating position for directing fluid flow from the liquid fluid line 20 to the evaporator 16 and a by-pass position for directing fluid flow through the by-pass passage 34. The integral valve 32 also includes a by-pass check valve 38, 40 for allowing only one-way fluid flow through the by-pass passage 34 when the by-pass valve 36 is in the by-pass position.

The integral valve 32 comprises a valve block, one solid and integral piece, having a liquid line bore 42 extending therethrough and a suction line bore 44 extending therethrough with the by-pass passage 34 comprising a transverse bore in the 32 block. Each of the liquid and suction bores would have threads or a similar fitting for connection to the lines of the system. The cross bore for the by-pass passage 34 could be cross-bored and capped. In the preferred embodiment, the liquid line and suction line bores 42, 44 are parallel to one another with the by-pass bore 34 being perpendicular to the liquid line and suction line bores 42, 44.

Figure 2:
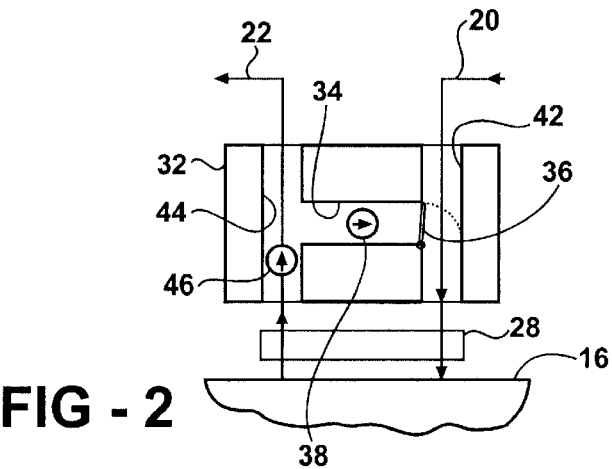
FIG. 2 is a schematic view of the first system with the by-pass valve in the normal operating position.
Figure 4:
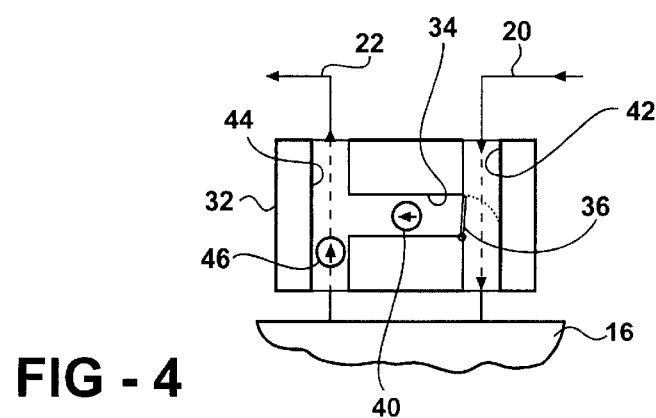
FIG. 4 is a schematic view of the second system with the by-pass valve in the normal operating position.

For reasons to be more clear herein after, the by-pass check valve 38 of the first system of FIGS. 1 and 2 allows only one-way fluid flow through the by-pass passage 34 from the suction fluid line 22 to the liquid fluid line 20 allowing the refrigerant to remain on high side in the R/D 24, whereas the by-pass check valve 40 of the second system of FIGS. 3 and 4 allows only one-way fluid flow through the by-pass passage 34 from the liquid fluid line 20 to the suction fluid line 22 allowing the A/D 26 to fill with refrigerant.

Also integrated into the valve block 32 is a suction check valve 46 in the suction fluid line 22 for allowing one-way fluid flow from the evaporator 16 to the compressor 12. The suction check valve 46 is disposed in the suction line bore 44 in the valve block 32.

Different systems may employ different combinations of control valves. Most systems will employ a control valve in one of the liquid 20 and suction 22 fluid lines adjacent the condenser 14 for controlling fluid flow therethrough and dividing the system into a section on either side of the control valve and extending to another section defined by the evaporator 16. In the first system of FIG. 1, the control valve comprises a liquid check valve 54 in the liquid fluid line 20 at the output of the condenser 14. This liquid check valve 54 divides the first system into three sections. Section one extends from the liquid check valve 54 to the suction check valve 46. Section two includes the evaporator 16 and section three extends from the by-pass valve 36 to the liquid check valve 54. When the control valve includes a first open and closed valve 50 in the discharge fluid line 18, the first section is subdivided into subsections 1a and 1b, as illustrated in FIG. 3. The first system of FIG. 1 includes a receiver/drier 24 disposed in the liquid fluid line 20 between the liquid check valve 54 and the evaporator 16 while the second system of FIG. 3 includes an accumulator/dehydrator 26 disposed in the suction line 22.

FIG. 1 shows a schematic diagram of a typical vehicular air-conditioning system showing the refrigerant loop including the compressor 12, condenser 14, expansion device 28, evaporator 16 and receiver/dehydrator (R/D) 24. In this configuration, the expansion device 28 is a thermal expansion valve (TXV) 28 located between the by-pass valve 32 and the evaporator 16, i.e, with the by-pass valve 32 between the TXV 28 and the evaporator 16. The TXV 28 could alternatively be located on the other side of the evaporator 16 from the valve 32. As can be noted in FIG. 1, this system consists of a liquid line check valve 54 and two check valves 38 and 46 that are embodied in a block that includes the bypass valve 36. As set forth above, these check valves effectively compartmentalize the refrigerant into three discrete sections. When the system shuts down for any reason, the bypass valve 36 moves to the by-pass position opens as shown in FIG. 1. The liquid line check valve 54 does not allow any back flow and the condenser 14 is at a higher pressure than the R/D 24. Thus, refrigerant will flow into the R/D 24 (or more specifically, into the third section) till the two pressures equalize. At this point, the R/D 24 may get full of liquid refrigerant, i.e., hold a major portion of the refrigerant. Also, the suction line check valve 46 will allow some of the refrigerant from the evaporator 16 to flow into the section one of the system. The by-pass check valve 38 prevents refrigerant from section three to empty out into section one, which it would do because section one is at a lower pressure. Thus the refrigerant will now be separated into three sections holding discrete amounts of refrigerants with the major portion in section three.

At a subsequent time, the evaporator 16 airflow could be turned on to drive off excess refrigerant into either section one or three depending on the pressures in those sections. Also after a long driving cycle, with the air conditioner never turned on, the engine compartment gets warm and warms up the compressor 14 and the R/D 24. If the compressor 14 gets warmer than the R/D 24, refrigerant will flow into section three from either the liquid line check valve 54 or the by-pass check valve 38. In general, the compressor 14 itself has in-built pseudo check valves (not shown) that do not allow flow backwards in the compressor 14. If the compressor 14 does not get warmer, it will cool down slower than the R/D 24 and under this condition (probably parked vehicle or winter driving), the refrigerant will again be forced into section three.

If a leak develops in the evaporator 16, the charge in section two will be released. If a leak develops in section one, both sections one and two will release their charge. If a leak develops in section three, the whole charge will get dumped. FIG. 2 shows the same configuration with the bypass valve 36 in the normal operating position.

If a leak out of the condenser 14 needs to be minimized, the solenoid operated shutoff or open and closed valve 50 may be disposed in the discharge fluid line 18 (as shown in FIG. 3). This will now separate the circuit into four sections by dividing section one into sub-sections 1a and 1b. A leak in section two will result in the charge in that section being released. A leak in sub-section 1b will result only in a release of charge in that sub-section 1b. Likewise, a leak in sub-section 1a will result in release of charge from sections two and three as well as sub-section 1a.

In the system of FIG. 3, the bypass valve 36 is normally open to isolate the evaporator 16 from the rest of the system when the system is turned off either because the air conditioner request is off or the vehicle is turned off. When the air conditioner system is turned on, the control valve 50 opens up via an actuator or solenoid and the bypass valve 36 closes to stop the flow from bypassing the evaporator 16 as shown in FIG. 4.

This system allows the elimination of one of the shutoff valves and incorporates this function into the valve block that can be easily mounted at the dash on the evaporator 16. The valve block 32 itself would be in the engine compartment allowing the line connections to be made easily in the assembly plant.

Obviously, many modifications and variations of the present invention are possible in light of the above teachings. The invention may be practiced otherwise than as specifically described within the scope of the appended claims.

What is claimed is:

1. An air conditioning system for a vehicle comprising:
   a compressor (12) for compressing a refrigerant;
   a condenser (14) for condensing the refrigerant;
   an evaporator (16) for evaporating the refrigerant,
   a discharge fluid line (18) interconnecting said compressor (12) and said condenser (14);
   a liquid fluid line (20) interconnecting said condenser (14) and said evaporator (16);
   a suction fluid line (22) interconnecting said evaporator (16) and said compressor (12);
   an integral valve (32) having a by-pass passage (34) extending between said liquid (20) and suction (22) fluid lines, a by-pass valve (36) at the intersection of said liquid fluid line (20) and said by-pass passage (34) having a normal operating position for directing fluid flow from said liquid fluid line (20) to said evaporator (16) and a by-pass position for directing fluid flow through said by-pass passage (34), and a by-pass check valve (38, 40) for allowing only one-way fluid flow through said by-pass passage (34) when said by-pass valve (36) is in said by-pass position.

2. A system as set forth in claim 1 wherein said intregal valve (32) comprises a valve block having a liquid line bore (42) extending therethrough and a suction line bore (44) extending therethrough with said by-pass passage (34) comprising a transverse bore in said valve block.

3. A system as set forth in claim 2 wherein said liquid line and suction line bores (42, 44) are parallel to one another.

4. A system as set forth in claim 1 including a suction check valve (46) in said suction fluid line (22) for allowing one-way fluid flow from said evaporator (16) to said compressor (12).

5. A system as set forth in claim 4 wherein said suction check valve (46) is disposed in said suction line bore (44) in said valve block (32).

6. A system as set forth in claim 4 including a control valve in one of said liquid (20) and suction (22) fluid lines adjacent said condenser (14) for controlling fluid flow therethrough and dividing said system into a section on either side of said control valve and extending to another section defined by said evaporator (16).

7. A system as set forth in claim 6 wherein said control valve comprises a first open and closed valve (50) in said suction fluid line (18).

8. A system as set forth in claim 6 wherein said control valve comprises a second open and closed valve (50) in said liquid fluid line (20).

9. A system as set forth in claim 8 including an expansion device (30) disposed in said liquid fluid line (20).

10. A system as set forth in claim 6 wherein said control valve comprises a liquid check valve (54) in said liquid fluid line (20).

11. A system as set forth in claim 10 including a receiver/drier (24) disposed in said liquid fluid line (20) between said liquid check valve (54) and said evaporator (16).

12. A system as set forth in claim 1 wherein said by-pass check valve (38) allows only one-way fluid flow through said by-pass passage (34) from said suction fluid line (22) to said liquid fluid line (20).

13. A system as set forth in claim 1 wherein said by-pass check valve (40) allows only one-way fluid flow through said by-pass passage (34) from said liquid fluid line (20) to said suction fluid line (22).

14. A valve for an air conditioning system for a vehicle comprising:

an integral valve block (32) having a extending therethrough and a suction line bore (44) extending therethrough and a by-pass bore (34) in said valve block extending transversely to said liquid (42) and suction (44) line bores, a by-pass valve (36) at the intersection of said liquid line bore (42) and said by-pass bore (34) having a normal operating position for directing fluid flow completely through said liquid line bore (42) to an evaporator (16) and a by-pass position for directing fluid flow through said by-pass bore (34), and a by-pass check valve (38, 40) for allowing only one-way fluid flow through said by-pass bore (34) when said by-pass valve (36) is in said by-pass position.

15. A valve block as set forth in claim 14 wherein said liquid line and suction line bores (42, 44) are parallel to one another.

16. A valve block as set forth in claim 1 including a suction check valve (46) in said suction line bore (44) in said valve block (32).

* * * * *